May 6, 1958  L. A. JAMES  2,833,427
DUMP CAR
Filed Feb. 23, 1954  4 Sheets-Sheet 1
FIG-1
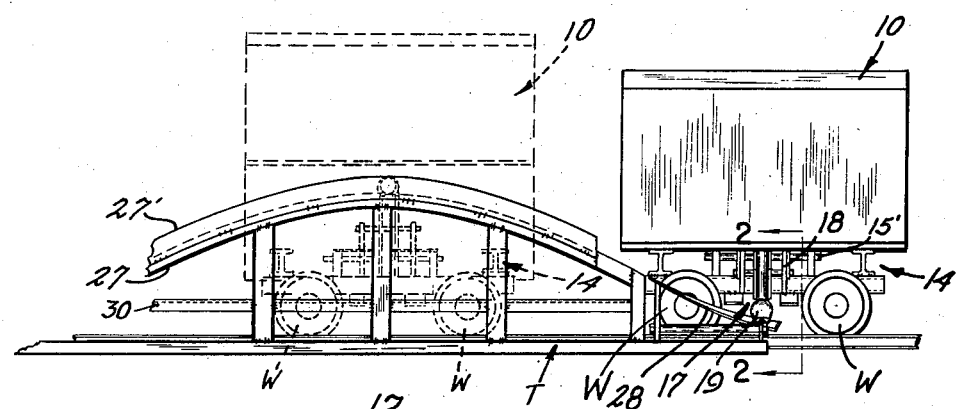
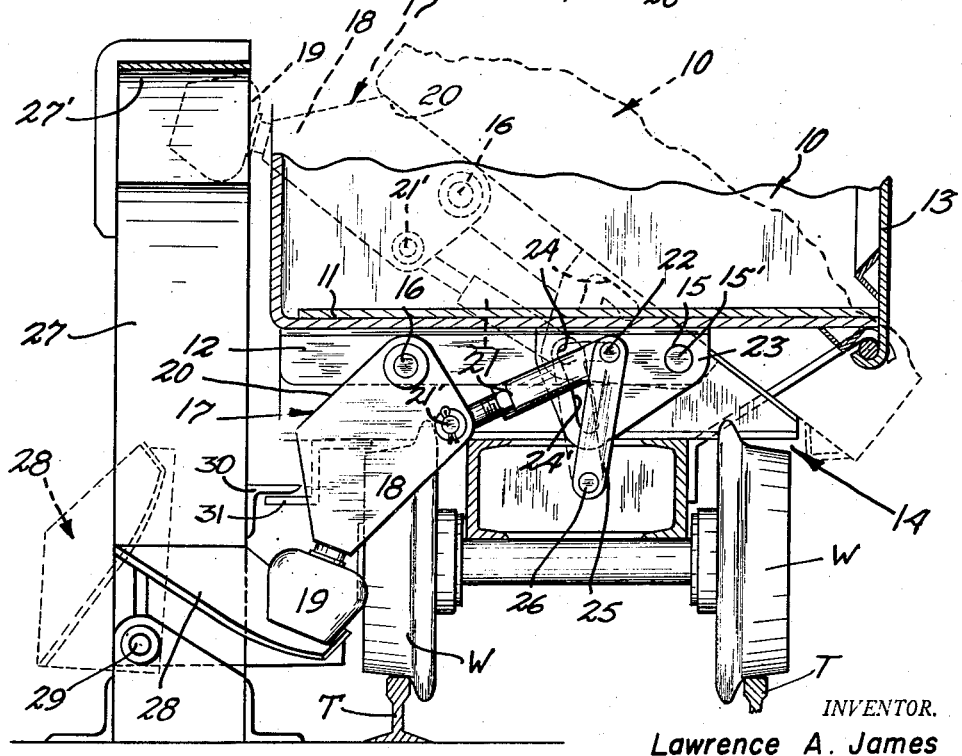
FIG-2
INVENTOR.
Lawrence A. James
BY May 6, 1958 L. A. JAMES 2,833,427
DUMP CAR
Filed Feb. 23, 1954 4 Sheets-Sheet 2

INVENTOR.
Lawrence A. James
BY

May 6, 1958   L. A. JAMES   2,833,427
DUMP CAR
Filed Feb. 23, 1954   4 Sheets-Sheet 3

INVENTOR.
Lawrence A. James
BY

United States Patent Office 2,833,427
Patented May 6, 1958

2,833,427

DUMP CAR

Lawrence A. James, Wallace, Idaho, assignor to Coeur d'Alene Hardware and Foundry Co., Wallace, Idaho, a corporation of Idaho Application February 23, 1954, Serial No. 411,986

11 Claims. (Cl. 214—62)

This invention relates to improvements in mobile dump cars.

The Granby type railway dump car pulled or moved by a suitable locomotive or other mobilizing means is in common use, particularly in the mining industry. The fundamental components of the Granby type dump car are a wheeled truck adapted to run along the rails of a railroad; a body hinged or pivoted along a side thereof to the wheeled truck; a hinged gate on the body at the dumping side; and a dump roller journaled on an arm projecting from the body and attached thereto opposite the dump gate. The dump roller is adapted to ride up an inclined ramp adjacent to the rails of the railroad, thus causing the hinged dump body to tip and discharge its load through the dump gate. The inclined ramp ordinarily adjoins a length of track that is elevated with reference to the rails upon which the car travels so that the body is in its tipped up dumping position for an appreciable length of time while the dump roller traverses the elevated track. Cars of this Granby type may be dumped while they are moving along at four or five miles an hour, thus spreading their load along the dump as they travel.

An objection to the Granby type car is that the dump roller ordinarily projects on a rigid arm from the side of the car body, thus creating a continuous hazard that might strike something, such as workmen, other equipment, the walls of the mine tunnel, etc.

It will be understood that in mining work, dump cars usually are required to operate where side clearances are limited. In a mine tunnel for instance, the walls of the tunnel may provide only a minimum of clearance for the ore cars.

It is highly desirable in designing and building cars for use in or adjacent to mines to have as great a capacity in the car body as possible with the lowest possible external measurements and minimum side clearance requirements.

Improvements have been made upon this Granby type dump car wherein the dump roller arm is normally positioned within the clearance lines of the car and may be laterally extended to project therefrom to contact the ramp and dump the car body. An undesirable feature of the improved mechanism is that it requires a workman to shift the dump roller arm to the projecting position when it is desired to tilt the car body and return the dump roller to the clearing position after the dumping action.

Therefore, it is a principal object of this invention to provide in a Granby type dump car a normally retracted mechanism adapted to be automatically extended to tilt the body and automatically returned to the retracted position upon completion of the dumping action.

Another object of the invention lies in the provision of a normally retracted mechanism, that may be automatically extended and retracted, combined with a locking mechanism adapted to lock the mechanism in its extended position upon initial tilting movement of the body and automatically release when the body is returned to its normal position.

These and other objects of the invention will become apparent during the course of the following description and the accompanying drawings wherein a preferred form of the invention along with a modified form is shown. It should be understood however, that the drawings and description are illustrative only and are not intended to limit the invention except insofar as it is limited by the appended claims.

In the drawings,

Figure 1 is a side elevation of a dump car embodying the present invention as it approaches a dumping ramp and showing a second dump car in dotted lines in the dumping position;

Figure 2 is a vertical transverse cross section taken at line 2—2 of Figure 1;

Figure 3:
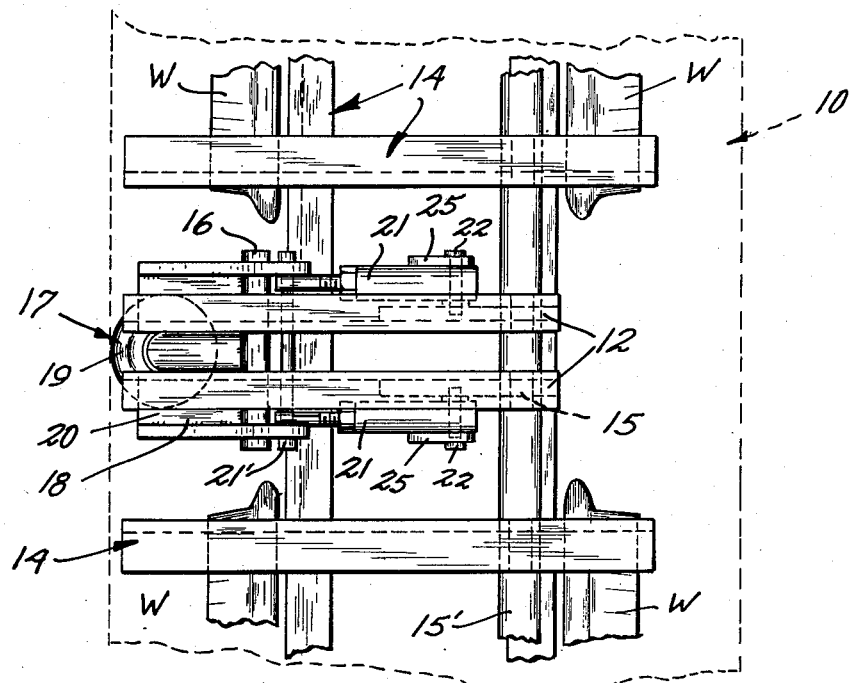
Figure 3 is a fragmentary horizontal plan cross section taken just under the bottom of the dump body.

Referring now more particularly to Figures 1–4, reference numeral 10 denotes a dump car body having a hinged dump gate 13. The body 10 is hinged to a wheeled truck 14 at 15 by means of a longitudinally extending shaft 15'. The dump body 10 is provided with a reinforced bottom 11 supporting the dump body on a plurality of transversely extending frame members, a number of which are indicated at 12.

Pivotally secured to the frame members 12 at 16, I provide a normally retracted mechanism 17 which is adapted to be laterally projected at times to facilitate dumping the dump car body 10 and includes a vertically tiltable arm 18 having a dump roller 19 journaled on its lower or outer free end. The dump arm 18 is shown to include a lifting surface 20 which is adapted to contact the bottom 11 of the dump body 10, as indicated by dotted lines of Figure 2, and tilt the body about the axis of shaft 15'.

When in the retracted position as disclosed in full line of the drawing, the dumping mechanism 17 is within the clearance lines of the dump car body 10 and may be extended to a laterally projecting position as indicated by dotted lines of Figure 2, the dump car body 10 being shown disposed in the dumping position. It will be noted that the dumping mechanism 17 is disposed below the dump body 10 and thus permits the dump body 10 to be of the greatest dimension found possible for the particular use with no depressions or recesses in the side walls or bottom thereof, thus the cubic capacity of the dump car is not reduced in any way and yet an automatic dump mechanism is provided.

In mining operations wherein the present mobile dump car is principally intended for use, the vertical clearance is usually sufficient to enable a man to walk upright through the tunnel and therefore, the height of the car is not particularly limited by reason of clearance and when its upper open edge is of a height making it convenient to load the car either by mechanical means or by manual shoveling, it is normally acceptable for the work.

It will be seen that I have moved the tilting axis of the dump car body 10 inwardly toward the longitudinal vertical median plane of the dump car and in so doing I utilize a portion of the weight of the dump car body 10 and its contents to nullify the effect to a great extent of the balance of the weight of the car body and contents, and minimize the lifting pressure necessary to tilt the car body 10 to the dumping position, thus reducing the strains and stresses on the dumping mechanism of the car. This also slightly raises the dump body 10 to provide clearance over the wheels W to permit tilting movement to the dumping position and also provides space for the component parts of the dumping mechanism.

Inspection of the drawing will reveal that the dumping mechanism 17 includes a brace member 21 here shown to be parallel bars, but which may be a single bar if desired, pivotally secured at 21' to the dumping arm 18 and at the inner end has a guideway follower 22. Secured to the bottom 11 of the dump body 10 is a vertically depending plate 23 disposed in a transverse plane and which has a guideway having a main portion 24 and a right angle or hooked portion 24' formed therein and cooperating with the guideway follower 22. A link 25 is pivotally secured at 26 to the truck 14 and at its upper opposed end is pivotally secured to the brace 21 coaxial with the guideway follower 22 permitting arcuate movement of the guideway follower 22 about the axis of the pivot 26, but precluding any movement toward or away from said pivot axis 26.

In dumping the dump body 10 of these dump cars, it is customary to use an inclined ramp 27 which is designed to cooperate with the roller 19 of the dump arm 18 and employ the forward movement of the dump car to raise the dumping mechanism 17 as the roller traverses the ramp 27 to tilt the body 10 to the dumping position.

Heretofore, it has been necessary to manually position the dumping mechanism 17 to effect dumping movement of the body 10 or to utilize a rigid dump mechanism which is continually disposed in a laterally projected position. In this invention, I provide a cam 28 which is adapted to laterally project the dumping mechanism 17 so that the dumping mechanism will cooperate with the ramp 27 to dump the contents from the body 10. It will be noted in Figure 2 that the cam 28 comprises a shaped tongue which is secured at a fixed location relative to the track T or path of movement of the dump car and is disposed to catch the roller 19 of the dumping mechanism 17 when in the retracted position and guide it onto the ramp 27. In dotted lines of Figure 2 I have shown that the cam 28 may be pivoted at 29 to a position removed from the track T to permit movement of dump cars in either direction to pass by the ramp 27 without catching or affecting the dumping mechanism. It will also be noted at this time that when a dump car is moved in a reverse direction to pass by the ramp 27 the roller 19 will strike the cam 28 when in the full line position on the reverse side; that is on the opposed side of that seen in Figure 2; and shift the cam about its pivot 29 to the dotted position of Figure 2, thus enabling the car to pass by the ramp.

At 30 and 31 of Figure 2 I have shown cooperating angle members, secured respectively one on the ramp and one on the truck 14 which prevent accidental tilting of the truck 14 from the track T during tilting movement of the car body 10. Inspection of Figures 2 and 4 will disclose that so long as the guideway follower 22 is disposed in the guideway main portion 24, the body 10 is locked against tilting with respect to the car frame because link 25 is pivotally secured at 26 at a fixed point on the frame.

In operation, during the time that the dumping mechanism roller 19 traverses the cam 28, the guideway follower 22 traverses an arcuate path along the guideway main portion 24 to its juncture with the right angle portion 24' of the angular guideway at which time the lifting surface 20 bears against the bottom 11 of the body 10 and as the roller 19 proceeds up the ramp 27 the body 10 is tilted at the axis 15. Upon initial tilting movement of the body 10 wherein the plate 23 raises or tilts with the body the guideway follower 22 held from raising by the link 25 enters the right angle portion of the guideway precluding lateral movement of the follower 22, thus temporarily securing the dumping mechanism 17 with relation to the body 10 wherein it is prevented from returning to a retracted position so long as the body is in the tilted position. Relative movement of the dumping mechanism 17 and the body 10 is thus prevented when the body is in the tilted position.

Since the pivot axis of the body 10 has been shifted inwardly of the car, it may easily become overbalanced in the dumping position and therefore, I provide a return ramp 27' disposed in upwardly spaced parallel relation to the ramp 27. The roller 19 passes between the ramp 27 and 27' and the ramp 27' is adapted to lower the roller 19 as the car traverses the track beside the ramp and thus return the body 10 over its center of gravity to its normal position. When the body 10 reaches its normal position the guideway follower 22 has traversed the right angle portion 24' of the guideway in the reverse direction due to lowering of plate 23 and has reached the juncture of the guideway main portion 24 and the angle portion 24' whereupon it may traverse the lateral arcuate path of guideway main portion 24 which allows the dump mechanism 17 to move to its retracted position.

Figure 4:
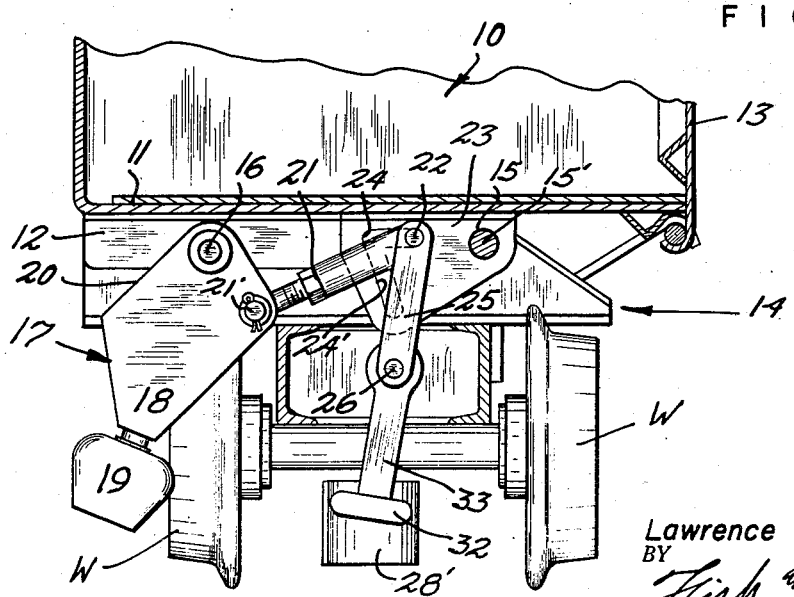
Figure 4 is a vertical transverse cross section similar to that of Figure 2 showing a modified dump mechanism actuating device.
Figure 5:
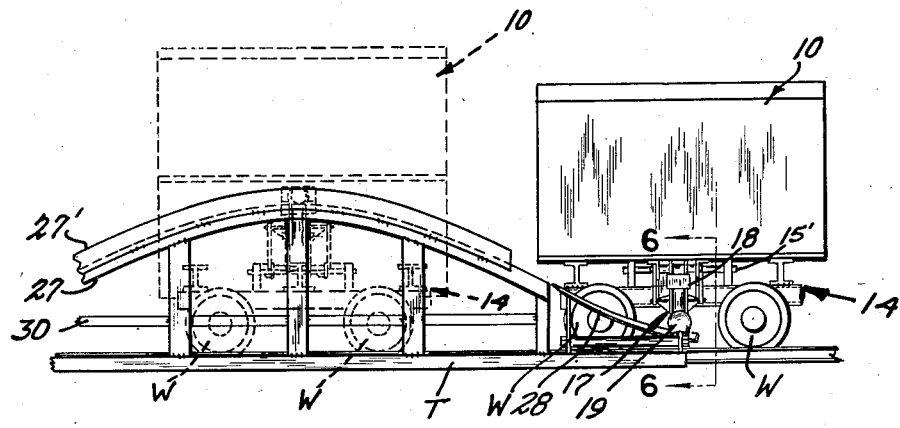
Figure 5 is a side elevation of a dump car embodying the present invention in a modified structure as it approaches a dumping ramp and showing a second dump car in dotted line in the dumping position.

In Figure 4 of the drawing I have disclosed a modified cam 28' as a means for projecting the dumping mechanism 17 and as here shown, the cam 28' is fixed intermediate the tracks T and is disposed to be contacted by a cam follower 32 journaled on the end of a lever 33 rigidly secured relative to the link 25, the unit being pivoted midway its length at 26. As the cam follower 32 traverses the cam 28' it is shifted laterally of the movement of the dump car, causing the link 25 to shift the guideway follower 22 along the lateral arcuate path applying axial pressure to the brace 21 which in turn urges the arm 18 to pivot at 16 and extends the roller 19 to a position where it will cooperate with the ramp 27.

In Figures 5, 6, 7, and 8 I have shown a modified form of the invention which is substantially the same inventive concept, but instead of the link 25, I employ a boss 34 on the end of the brace 21 and the boss is adapted to strike a frame member 14' of the truck 14 when the body 10 reaches its normal position and thus cause the guideway follower 22 to be shifted out of the right angle portion 24' of the guideway 24.

Figure 6:
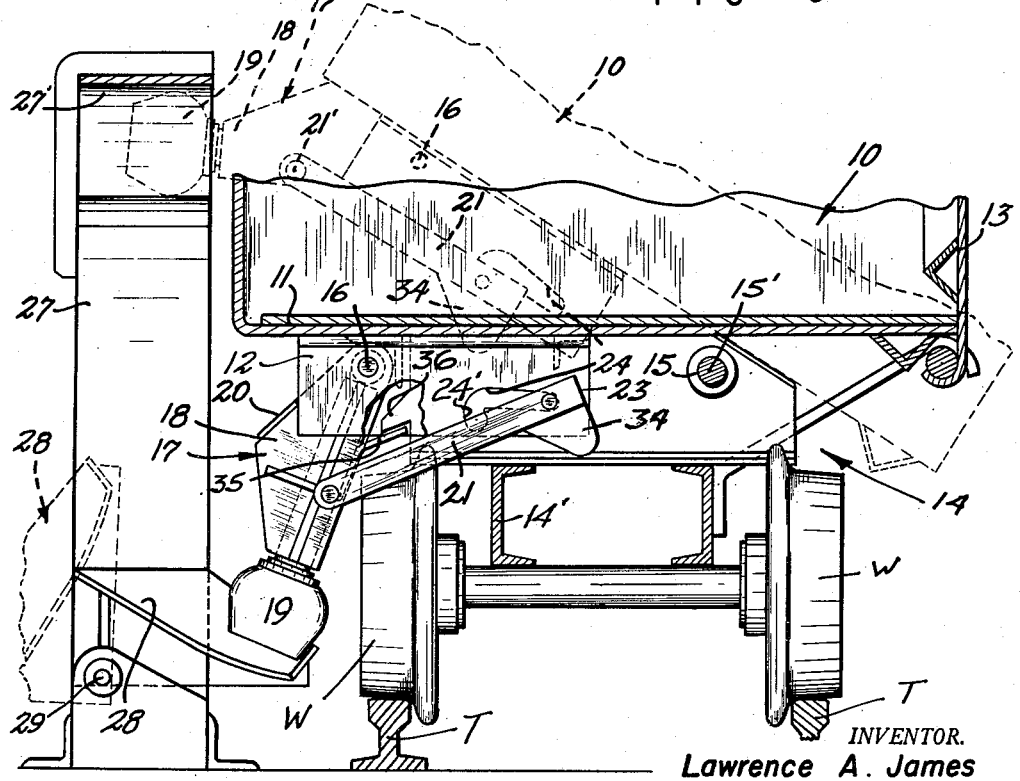
Figure 6 is a vertical transverse cross section taken at line 6—6 of Figure 5.
Figure 7:
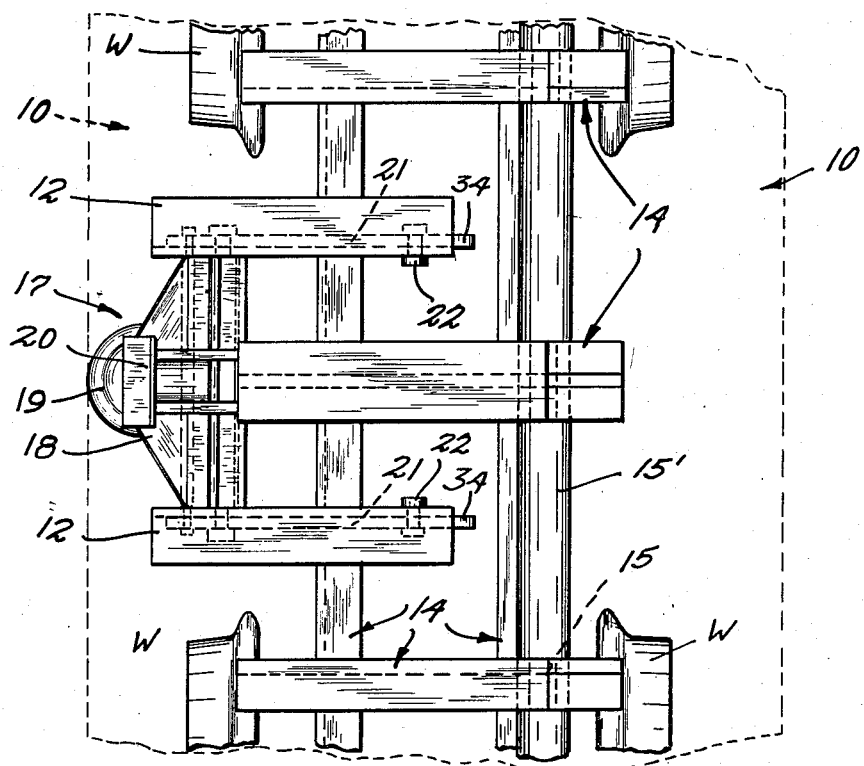
Figure 7 is a fragmentary horizontal plan cross section taken just under the bottom of the modified dump body.
Figure 8:
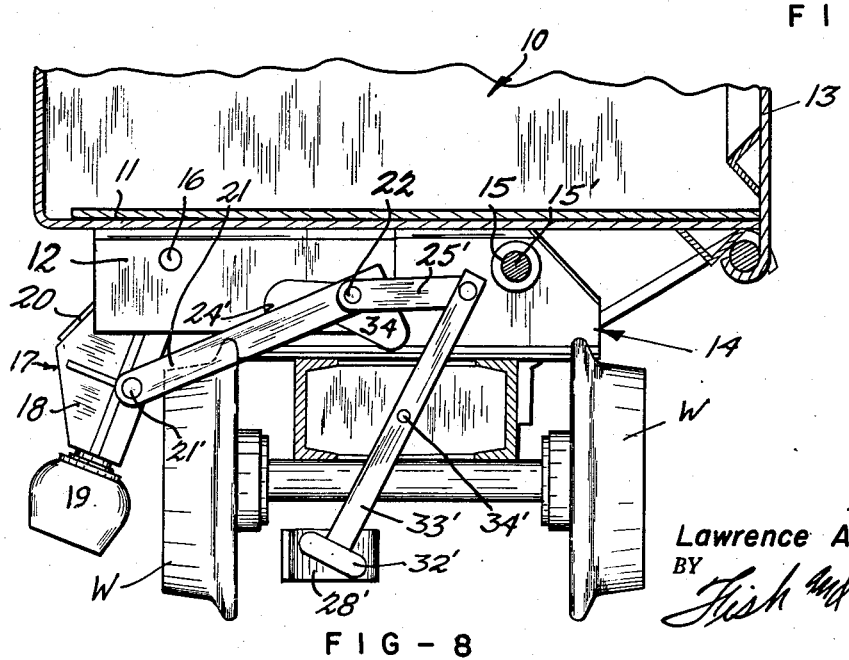
Figure 8 is a vertical transverse cross section similar to that of Figure 2 showing a further modified dump mechanism actuating device.

The dumping mechanism 17 of this disclosure may be actuated by means of the cam 28 as indicated in Figure 6 or by means of the cam 28' as indicated in Figure 8, wherein I again employ a link 25' pivotally secured at the axis of the guideway follower 22 and actuated by means of a lever 33' pivoted at 34' to the truck 14 and having a cam follower 32' journaled on the end.

In this embodiment, to prevent accidental tilting movement of the dump body 10 as the car traverses curves or receives lateral bias otherwise I provide a laterally extending lip 35 on the arm 18 which operates by hooking under a member or lip 36 on the member 12 of the truck 14 to releasably lock the body 10 to the truck when the dumping mechanism is in its normally retracted position. Obviously when the arm 18 carries the tongue and is movable with the body during tilting movement of the body then the interlocking lips 35 and 36 respectively fixed to the arm 18 and frame 14 releasably secure the body against tilting movement relative to the frame 14.

Having thus described my invention, I claim:

1. The combination with a tiltable dump car body pivotally carried by a frame adapted to traverse a predetermined path; of a normally retracted mechanism on the body and at times adapted to project laterally therefrom to contact a ramp and tilt and return said body over its center of gravity to and from a dumping position; locking means releasably securing said body against tilting movement relative to said frame and releasable upon initial projecting movement of said mechanism; and means disposed relative to said path to engage and automatically extend said mechanism to a projecting position at a predetermined location along said path.

2. The combination with a tiltable dump car body pivotally carried by a frame adapted to traverse a predetermined path; of a normally retracted mechanism on the body and at times adapted to project laterally therefrom; a dump roller journaled on said mechanism to contact a ramp and move said mechanism to tilt and return said body over its center of gravity to and from a dumping position; locking means releasably securing said body against tilting movement relative to said frame and releasable upon initial projecting movement of said mechanism; and means disposed relative to said path to engage and automatically extend said mechanism to a projecting position at a predetermined location along said path.

3. The combination with a tiltable dump car body pivotally carried by a frame adapted to traverse a predetermined path; of a gravitationally retracted mechanism on the body and at times adapted to project laterally therefrom to contact a ramp disposed relative to said path and tilt and return said body over its center of gravity to and from a dumping position; locking means releasably securing said body against tilting movement relative to said frame and releasable upon initial projecting movement of said mechanism; and means disposed relative to said path to engage and automatically extend said mechanism to a projecting position at a predetermined location along said path.

4. In a dump car having a wheeled truck supporting a dump body hinged thereto for vertical tilting movement laterally thereof; a normally retracted mechanism pivotally secured to the body for tilting movement relative thereto and at times adapted to project laterally therefrom in body lifting position; and means constructed and arranged to releasably secure said mechanism rigidly to said body in the body lifting position upon initial tilting movement of the body from its normal position and releasable only upon return of said body to substantially its normal position.

5. In combination a dump car having a wheeled truck supporting a dump body hinged thereto for vertical tilting movement over its center of gravity laterally thereof; a normally retracted mechanism pivotally secured to the body and at times adapted to project laterally therefrom in body lifting position; means constructed and arranged to releasably secure said mechanism rigidly to said body in the body lifting position upon initial tiltng movement of the body from its normal position; and dumping mechanism fixed relative to the path of movement of said truck and having an inclined dump ramp and an upwardly spaced return ramp cooperating with said normally retracted mechanism for respectively tilting said body over its center of gravity to a dumping position and returning said body to its normal position.

6. In combination a dump car having a wheeled truck supporting a dump body hinged thereto for vertical tilting movement from its normal position resting thereon over its center of gravity laterally thereof to a tilted dumping position; the axis of said vertical tilting movement being disposed slightly spaced from the longitudinal vertical median plane of the dump car to employ a portion of the weight of the dump body and contents to overcome to a large degree the balance of weight of the dump body and contents tilting over said axis; a ramp; a normally retracted mechanism on the body and at times adapted to project laterally therefrom to contact the ramp and tilt said body to a dumping position and return said body to a normal position; means releasably fixing said mechanism rigidly to said body in the projected position during the interval of time said body is tilted from said normal position; said ramp including an inclined dumping portion and an upwardly spaced return portion intermediate which said mechanism passes when in the dumping position; and means disposed relative to the path of travel of said dump car to engage and automatically extend said mechanism to a projecting position at a predetermined location along said path.

7. The combination with a tiltable dump car body pivotally carried by a frame adapted to traverse a predetermined path; of a normally retracted mechanism on the body and at times adapted to project laterally therefrom to contact a ramp and tilt and return said body over its center of gravity to and from a dumping position; locking means releasably securing said body against tilting movement relative to said frame and releasable upon initial projecting movement of said mechanism; other means locking said body and mechanism together against movement relative to each other upon initial tilting movement of the body from its normal position; and means disposed relative to said path to engage and automatically extend said mechanism to a projecting position at a predetermined location along said path.

8. The invention as defined in claim 1 and including other means locking said body and mechanism together against movement relative to each other upon initial tilting movement of the body from its normal position; and said means disposed relative to said path to engage and automatically extend said mechanism, being a cam disposed relative to said path to contact said mechanism.

9. The combination with a tiltable dump car body pivotally carried by a frame adapted to traverse a predetermined path; of a normally retracted dump mechanism including an arm pivotally secured at a fixed location on the body for vertical tilting movement from a normally retracted position to a laterally projecting position to contact a ramp and tilt and return said body over its center of gravity to and from a dumping position; a brace pivotally connected at one end to said arm; an angular guideway provided in the body; the opposed end of said brace having a guideway follower adapted to traverse the guideway during tilting movement of said body for releasably securing said body against tilting movement relative to said frame and releasable upon initial projecting movement of said mechanism and successively adapted to releasably securing said arm against movement relative to said body upon initial tilting movement of the body from its normal position; and means carried by said brace and actuable by means of a cam for extending said arm to the projecting position.

10. The invention as defined in claim 1 wherein the normally retracted mechanism comprises an arm pivotally secured at a fixed location on the body for vertical tilting movement from a normally retracted position to a laterally projecting position; a dump roller journaled on the free end of said arm; and said locking means includes a laterally extending tongue on said arm releasably hooked under a member of said frame for precluding tilting movement of said dump body when said arm is in its normally retracted position.

11. The invention as defined in claim 1 wherein the normally retracted mechanism has journaled on the free end of said mechanism, a dump roller adapted to contact a ramp; a guideway follower on said mechanism and movable therewith during the tilting movement thereof; a guideway fixed relative to said dump body, containing and guiding said guideway follower; said guideway being substantially right angular in shape to receive said guideway follower and releasably secure said mechanism and said dump body together upon initial tilting movement of the body from its normal position.

References Cited in the file of this patent

UNITED STATES PATENTS

| | | |
|---|---|---|
| 1,016,570 | Lawton | Feb. 6, 1912 |
| 1,513,576 | Benbow | Oct. 28, 1924 |
| 2,364,554 | Sanford | Dec. 5, 1944 |
| 2,623,651 | Vial | Dec. 30, 1952 |

FOREIGN PATENTS

| | | |
|---|---|---|
| 365,972 | Germany | Dec. 27, 1922 |
| 76,061 | Norway | Dec. 19, 1949 |